Figure 1:
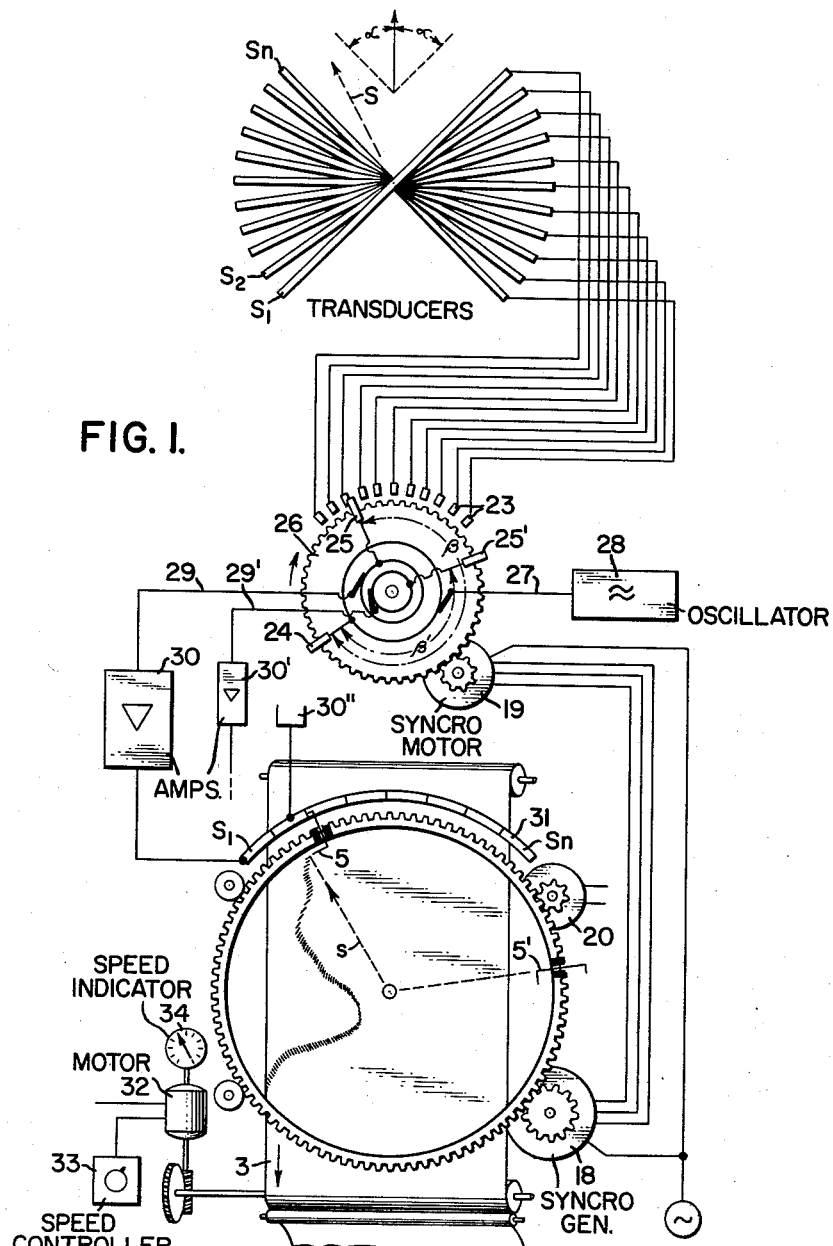

United States Patent Office 3,121,855
Patented Feb. 18, 1964

3,121,855
METHOD AND APPARATUS OF MEASURING DIRECTION AND DISTANCES OF REFLECTING OBJECTS
Heinz Thiede, Bremen, Germany, assignor to Atlas-Werke Aktiengesellschaft, Bremen, Germany
Continuation of application Ser. No. 497,305, Mar. 28, 1955. This application Nov. 2, 1959, Ser. No. 850,328
6 Claims. (Cl. 340—1)

This invention relates to a system for locating objects in the sea by the use of compressional waves and for recording the position of objects encountered in the path of a ship under way on a continuous recording strip. This application represents a continuation of the copending application entitled Method and Apparatus of Measuring Direction and Distances of Reflecting Objects, Serial No. 497,305, filed March 28, 1955, now abandoned.

For detecting objects in water by the reflection of sound waves it is known to rotate first a highly directional transmitter and together with it a beam of ultrasonic waves through a sector of the horizontal plane and, after the lapse of a certain time, a highly directional receiver through the same sector at the same speed, its direction of maximum sensitivity thereby sequentially taking on the positions of the previously transmitted beam. Echoes which are picked up during the rotation of the receiver derive from objects located in an annular zone, the radial distance of which depends on the time delay of the rotation of the receiver in relation to that of the transmitter. It is also known to record the received echoes on a continuously advanced recording strip by means of a stylus which is rotated on a circular path in synchronism with the rotation of the receiver whereby the direction of objects from which echoes are received is indicated on the strip.

The mechanical rotation of a transmitter and receiver the dimensions of which in the horizontal plane have to be a multiple of the wave length employed in order to ensure a sufficient directionality necessitates the provision of an appropriate mechanical arrangement which is expensive and apt to break down. The present invention employs instead an array of directional transducers which are fixedly mounted on the bottom of a ship's hull and the directional radiation lobes of which are arranged to cover a forward sector with slight overlapping of the individual lobes, in combination with a switching mechanism for operating the individual transducers separately and sequentially as transmitters and with a chosen time delay as receivers. Apart from the discontinuities caused by the employment of individual transducers and which may be lessened by providing a sufficient number of them, the operation of this device results in rotating a transmitting and a receiving direction through the forward sector. A recording stylus is coupled to the switching mechanism so as to rotate in synchronism with the receiving direction in an arcuate path across a moving recording strip. Further, means are provided for regulating the speed of the recording strip to be in the inverse ratio to the radius of rotation of the stylus as the radius of the annular zone from which echoes are received is to the speed of the vessel. Thus a strip map of a region having the course of the ship as its center line is produced.

In order especially to cover moving objects with greater certainty, it is advisable to provide a plurality of parallel scanning lines, so that each object is repeatedly recorded each time a scanning line intersects it. In such an arrangement, in order to ensure that repeated recording of a stationary object coincide, it is necessary to advance the recording strip at a rate proportional to the speed of the vessel, in known manner, this rate being such in relation to the mechanism controlling the movement of the stylus or styli, that the ratio thereof to the speed of the vessel shows the same reduction factor as that employed in the representation of distances as measured by the echo return time. Moreover, the connecting line between the point on the record corresponding to the position of the vessel at any instant and the momentary position of the stylus on the recording strip, must include the same angle with the reverse direction of the paper feed, as that included by the direction from which the echo is received and the direction of travel. Expressed in simpler terms, the configurations of the point on the recording strip corresponding to the position of the ship at any instant, of the reverse direction of the paper feed as to direction and magnitude and of the path of the stylus and the position of the stylus at any instant must be a replica of the configurations of the actual ship's position, of the speed of the ship as to direction and magnitude and of the position at that instant of the scanning line and of the point from which at that moment echoes are received and recorded.

The echo ranging can be carried out using a transducer system of high directional selectivity, the directional radiation of which can be caused to sweep in steps, or continuously, the area to be scanned.

It is also possible to employ a plurality of stationary receiving systems of high directional selectivity, each of which covers a different narrow sector and which are used in quick successive emissions in the various directions of the swept sector, it is also possible to emit pulses in all directions simultaneously, in which case the scanning lines and the recording lines take the form of an archimedian spiral and the styli will be guided on corresponding paths.

A system according to the invention is shown in the accompanying drawing.

Figure 2:
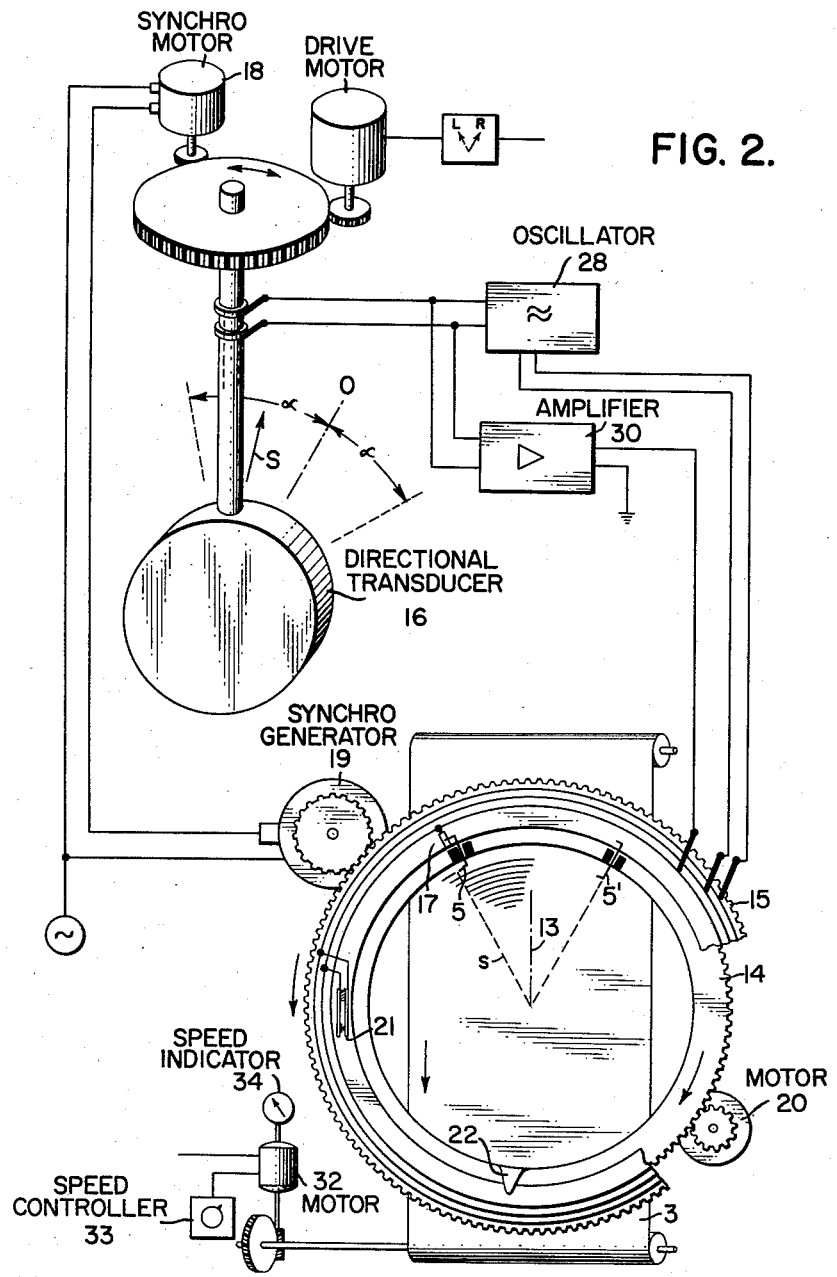

FIG. 1 shows an embodiment of the invention capable of simultaneously receiving a number of echoes from different directions; and FIG. 2 shows a modification to permit the reception of echo signals from different distances.

$S_1$, $S_2$, $S_n$, are $n$ sharply directional transducers which are fixedly mounted on the hull of a ship to transmit and receive in a horizontal plane which coincides with the drawing. The forward sector which is to be searched by consecutively switching on the transducers has an angular width of $2\alpha$. Each transducer transmits and receives in a sector of width $$\frac{2\alpha}{n}$$

the individual sectors being disposed to adjoin each other and, in the aggregate, to fill the forward sector $2\alpha$. Each transducer is connected to one of a series of contacts 23 which are evenly distributed over an arc of width $2\alpha$. The fixed contacts 23 are swept periodically and in succession by two moving contacts 24 and 25 which are arranged at an angular distance $\beta$ on a rotating disc 26 which is driven by synchro motor 19. Both the contacts 24 and 25 are connected to slip rings from which connection is made by brushes through a line 27 to an oscillator 28 and through a line 29 to a receiving amplifier 30 respectively. The output of the amplifier is fed through an arcuate contact bar 31 to a stylus 5 which is moved in a circular path by a rotating ring to which it is fixed and which is driven at its toothed periphery by a gear and motor 20. A synchro generator 18 is driven from the ring and electrically connected to synchro motor 19, whereby a synchronous rotation of the stylus and the contact 24 and 25 is obtained. While contact 25 sweeps the contacts 23 and switches on consecutive transducers for reception, the direction of which varies, the stylus traverses a recording strip 3, the direction s from the center of rotation of the stylus always corresponding, or nearly so, to the momentary direction of reception S. An echo received by a transducer while connected as a receiver causes a marking to be made on the recording strip by the stylus 5. The distance of the objects echoes from which are recorded is given by time interval of the sweeps of contacts 24 and 25 across contacts 23. These contacts therefore effectively comprise gate means for selecting the contemporaneous increment of radical range embracing objects whose echoes may then activate the stylus to record.

The advance mechanism of the recording strip is driven from a motor 32, the speed of which is adjusted by a controller 33 for the advance speed of the strip, which is shown on a speed indicator 34, to be proportional to the ship's speed as found by a log. By making their ratio equal to that of the radius of rotation of the stylus and the distance from which the recorded echoes are received a conformal representation of the position of objects in the sea along the course of the ship is produced, in which the center of rotation of the stylus corresponds to the momentary position of the ship. Transmission gearing may be provided for directly deriving the paper feed from a log and maintaining the specified relationship between the feed and the ship's speed. Alternatively, this adjustment may be made by hand.

In a more elaborate embodiment of the system the portion comprising parts 25, 29, 30, 31 and 5 may be provided in multiple, each set of parts being adjusted to record echoes from another range zone. Each of contacts 25 would be arranged to include another angle $\beta$ with the transmitting contact 24 and would be associated with another stylus 5 at a distance from the center of rotation proportional to the angle $\beta$. The scribing tips of the styli would be disposed on a spiral originating at the center of rotation and the styli moving in synchronism around this center.

In such a system it is imperative to conform to the condition for conformal representation as given above of the spots in the searched field echoes from which are recorded as only then the markings obtained for consecutive transmissions will be positioned correctly in relation to each other.

In order to more accurately represent the tracks of moving objects, it is advisable to provide a plurality of parallel scanning lines, so that each object is repeatedly recorded each time a scanning line intercepts it. Simultaneous recording of echoes obtained from a plurality of scanning lines may be effected in the apparatus shown in FIG. 2 wherein a plurality of spaced styli 5 is provided on the ring 14. The sliding brushes of the styli pass in succession over the contact 17. The scribing tips of the styli are disposed upon an Archimedian spiral so as to move on circles of progressively increasing radius according to the sequence in which the styli are connected to segment 17. Each incremental change in radius corresponds to a related change in echo distance.

Each stylus 5 is located on the annulus 14 and is supplied with current through a sliding brush, which slides on a second concentric ring 15. This ring 15 does not move with constant unidirectional velocity as does annulus 14 driven by drive motor 20, but is oscillated to and fro over an angle $\pm\alpha$ to the forward direction or to the middle line of the strip by synchro generator 19, in synchronism with a directional transducer 16. This electrically nonconducting ring 15 carries a contact segment 17, which conducts any incoming echo pulses from amplifier 30 to a stylus 5 when a connected sliding brush slides over the contacting segment 17. Whereas the transducer 16 and segment 17 only oscillate to and fro relatively slowing in synchronism, the annulus 14 and stylus 15 rotate much quicker. Thus, while the contact segment 17 advances by a distance corresponding to its own breadth, a stylus 5 has performed one complete rotation and consequently is ready to receive a pulse at all angular positions of the transducer 16 and of the segment 17 and can effect the requisite recording over this angular range. Segment 17 is rotated in synchronism with transducer 16 by means of the synchronous linkage between synchro motor 18 and synchro generator 19. A pair of keying contacts 21 are mounted on the ring 15 and a switch cam 22 is mounted on the ring 14, so that there is always a finite delay between transmission of a pulse and making contact between a stylus 5 and segment 17. Thus, only those echoes which arrive after the end of this time interval after the transmission of the sound pulse are passed to a stylus 5 and cause markings.

In an arrangement incorporating a plurality of receivers, for example, as shown in FIG. 1, echoes can also be received from different distances and/or from various directions simultaneously. In this case, groups of styli are provided wherein the scribing tips shown in FIG. 2 lie upon an Archimedian spiral. In order to avoid mutual interference between adjacent parts of a sector when echo soundings in different directions simultaneously are in close sequence, different frequencies may be allotted afternately to successive directions.

For example, the transducers may be severally allotted frequencies of 50, 100 and 180 kcs.

The distance from which echoes are received and recorded corresponds to the angular displacement of the particular receiving contact 25 with respect to transmitting contact 24; that is, the distance depends upon the magnitude of angle $\beta$. The radii of the circles on which the styli connect to different receiving contacts 25 rotate, are said to correspond to said distance, the angular position of the styli corresponding to the angular position of the associated receiving contacts 25.

There has been described a novel system for providing a visual representation of fixed and moving objects in the vicinity of a moving vehicle. It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. In a system for the recording of objects encountered along the course of a ship by the reflection of compressional waves producing echoes returned to said ship, in combination, an array of directional transducers arranged to cover a forward sector by their adjoining directional pattern lobes, a plurality of receiving amplifiers, a like plurality of styli energized by the output of respective ones of said receiving amplifiers, said styli being rotatably mounted to move in synchronism around their common center of rotation with the tips of said styli being disposed on a spiral, means for synchronously rotating said styli in angular conformity to the varying direction of reception of compressional wave echoes, a recording strip opposite said styli for receiving markings when said styli are energized from said receivers, said markings being in correspondence to the distance of said objects whose echoes are received, and means for controlling the feed of the recording strip to be in a constant ratio to said ship's speed, said ratio being the radius of rotation of each stylus to the distance from which echoes are received thereby.

2. In combination with means mounted on a vehicle transmitting and receiving wave energy pulses in continuous succession over a selected azimuthal range; apparatus comprising, a plurality of fixed transducers secured to said vehicle and arranged to both illuminate the like plurality of contiguous sectors comprising said selected range and receive energy returned from reflecting objects, recording apparatus comprising a continuously moving strip of electro-sensitive paper with its center line corresponding to the path of travel of the vehicle, a stylus moving in a circular path over the surface of the strip, means synchronizing the circular movement of the stylus with the transmission of the pulses from selected ones of the fixed transducers so that the angle between the pulses and the direction of the vehicle is equal to the angle of displacement of the stylus from the center line of the strip, an electrical circuit selectively interconnecting said fixed transducers and said stylus, and a gate means in the circuit for selecting the contemporaneous increment of radial range then embracing reflecting objects whose pulses then activate the stylus to record on the strip.

3. A device as defined in claim 2 and further comprising means moving the strip at a rate proportional to the speed of the vehicle and means in the circuit between the gate means and the stylus for limiting the angular width of the sector then embracing reflecting objects whose echo pulses then activate the stylus to record on the strip.

4. In combination with a plurality of fixed directional transducers each covering a fraction of a preselected angle to be scanned and transmitting wave energy pulses and receiving echoes of the transmitted pulses reflected from objects, said transducers being mounted on a vehicle; recording apparatus comprising a bank of contacts with one contact connected to each transducer, a transmitting contact electrically connected to a pulse generator and sweeping the bank of contacts for energizing the directional transducers in succession, a receiving contact mechanically connected to and moving with the transmitting contact over the bank of contacts, a strip of recording material moving longitudinally along a path at a rate proportional to the speed of the vehicle, a stylus moving on a circular path over the surface of the strip and synchronized with the receiving contact, and means electrically connecting the receiving contact with the stylus causing the stylus to record on the strip the echo pulses received by the transducers.

5. A device as defined in claim 4 and further comprising, means establishing the receiving contact lagging the transmitting contact in its sweep over the bank of contacts causing the stylus to record the echo pulses from reflecting objects only at preselected distances from the transducers.

6. Echo sounding apparatus aboard a vehicle comprising, a plurality of directional transducers in fixed relationship to said vehicle, the directional radiation pattern of each transducer partially overlapping that of a neighboring transducer so that the combination of said transducers may illuminate a predetermined continuous angular sector bounded by the directional radiation patterns of the end ones of said plurality of transducers, each of said transducers capable of transmitting wave energy along its direction of maximum radiation and receive energy returned from reflecting objects located substantially along said direction, a terminal coupled to each transducer, a source of energy pulses, a recording stylus, switching means for first coupling said source of energy pulses to said terminals in consecutive sequence and thereafter coupling said stylus to said terminals in the same consecutive sequence, and means for moving said stylus in synchronism with operation of said switching means so that the position of said stylus is representative of the transducer then coupled thereto.

References Cited in the file of this patent

UNITED STATES PATENTS

| | | |
|---|---|---|
| 2,475,363 | Turner | July 5, 1949 |
| 2,648,838 | Raymond | Aug. 11, 1953 |
| 2,703,396 | Rich | Mar. 1, 1955 |
| 2,759,783 | Ross | Aug. 21, 1956 |
| 2,767,386 | Ross | Oct. 16, 1956 |
| 2,995,725 | Kliever et al. | Aug. 8, 1961 |
| 3,005,973 | Kietz | Oct. 24, 1961 |

FOREIGN PATENTS

| | | |
|---|---|---|
| 490,750 | Canada | Feb. 24, 1953 |